Dec. 18, 1962    M. H. GROVE    3,069,128
BUTTERFLY VALVE SEAL CONSTRUCTION
Filed Aug. 22, 1960
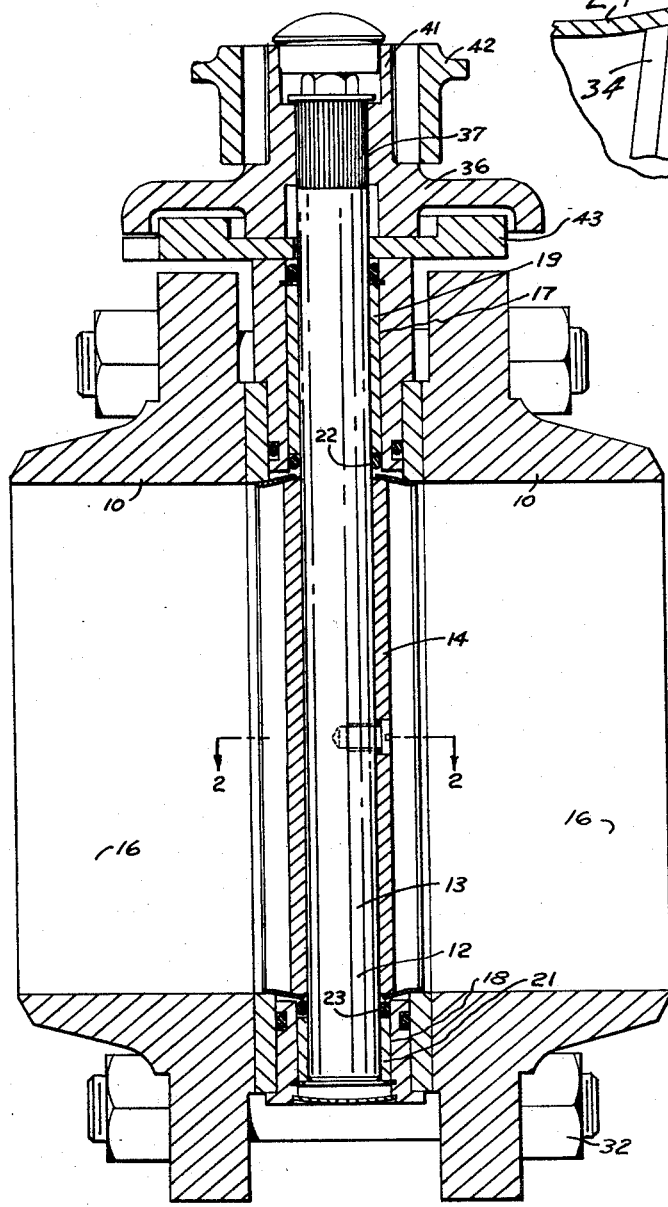
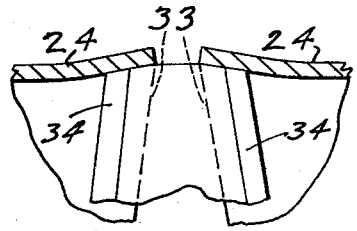
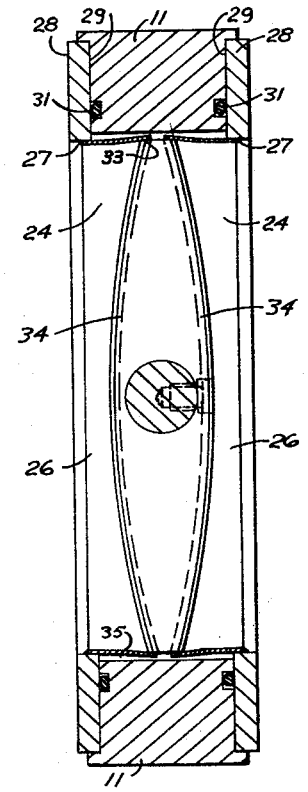
INVENTOR
MARVIN H. GROVE
BY
ATTORNEYS though it is difficult to provide uniform metal-to-metal contact pressure over an extended sealing zone. This difficulty becomes more critical for valves of the larger sizes, where it is difficult if not impossible to maintain close mechanical toleranaces as to proportions and alignment.

United States Patent Office 3,069,128
Patented Dec. 18, 1962

3,069,128
BUTTERFLY VALVE SEAL CONSTRUCTION
Marvin Henry Grove, 340 Hillside Ave., Piedmont, Calif.
Filed Aug. 22, 1960, Ser. No. 50,910
3 Claims. (Cl. 251—173)

This invention relates generally to valves of the butterfly type for controlling fluid flow.

Conventional valves of the butterfly type employ a disc-like valve member carried by shaft means within the valve body, and movable through 90° between a closed position in which it extends substantially at right angles to the axis of the flow passages, and an open position in which it extends substantially coincident with such axis. Various sealing means have been employed with such valves to establish fluid tight shutoff. For example, resilient seal rings have been employed such as disclosed in Patent 2,882,010. The material used in such resilient seal rings may be synthetic rubber or rubberlike materials, such as Hycar, neoprene, Kel-F, Teflon or nylon. While such resilient seal rings are suitable for many services, there are many instances where they cannot be used, as for example, where the materials are deteriorated by the particular fluids being handled, or where the temperatures involved are relatively low or high. Metal sealing surfaces avoid many of the limitations of resilient materials, but in the past it has been difficult with conventional constructions to maintain a reasonably tight metal-to-metal seal. This is because it is difficult to provide uniform metal-to-metal contact pressure over an extended sealing zone. This difficulty becomes more critical for valves of the larger sizes, where it is difficult if not impossible to maintain close mechanical toleranaces as to proportions and alignment.

In general, it is an object of the present invention to provide a new and improved butterfly valve construction which employs metal-to-metal sealing surfaces.

Another object of the invention is to provide a butterfly valve of the above type having metal sealing means acted upon by upstream fluid pressure to maintain a desired seal.

Another object of the invention is to provide a butterfly valve with metal sealing means, and characterized by its inehrent ability to accommodate variations in tolerances normally encountered in manufacture and assembly.

Additional objects and features of the invention will appear from the following description in which the preferred embodiment has been set forth in detail in conjunction with the accompanying drawing.

Referring to the drawing:

FIGURE 1 is a cross sectional view in side elevation, illustrating a butterfly valve incorporating the present invention.

FIGURE 2 is a cross sectional view taken along the line 2—2 of FIGURE 1, with the hubs removed.

FIGURE 3 is an enlarged detail in section illustrating the manner in which the metal sleeve means makes sealing contact with the valve member on two sealing zones.

The valve illustrated in FIGURE 1 consists of a body formed in three main parts, namely, the hub parts 10 that are adapted to connect with associated piping, and the intermediate body part 11. A shaft 13 extends diametrically through the valve member 14, and has its axis at rgiht angles to the axis of the passages 16, formed in the body parts 10.

For the purpose of journaling the projecting ends of the shaft 13, the intermediate body part 11 is provided with the aligned bores 17 and 18, within which the journal bushings 19 and 21 are fitted. Sealing rings 22 and 23 of the O-ring type are provided at the inner ends of the bushings to prevent leakage past the projecting ends of the shaft.

Special metal sealing means is carried by the body and consists of the two thin spring metal sleeves 24, which may be duplicates. The material used for the sleeves may depend upon the particular service for which the valve is used. Particular reference can be made to such materials as the stainless steels, Monel metal, bronze and the like. The remote end margins 26 of the two metal sleeves have sealed connections 27 (as by brazing or welding) with the inner peripheries of the annuluses 28. These annuluses are seated within the recesses 29 formed in the sides of the intermediate body part 11. Suitable sealing means, such as resilient rings 31 of the O-ring type, are provided to prevent leakage between the annuluses 28 and the body parts 11. In the complete assembly illustrated in FIGURE 1 it will be noted that the annuluses 28 are interposed between the adjacent faces of the hubs 10, and the intermediate body part 11. Suitable means such as bolts 32 serve to clamp all of the body parts together and upon the annuluses 28.

It will be evident from FIGURES 1 and 2 that the end margins 27 of the metal sleeves 24 have a configuration such that they conform to parallel planes. However, the configuration of the other end margins 33 is such that they are nonplanar and preferably conform to the surfaces of cylinders having axes at right angles to the axis of the passages 12 and to the corresponding axes of the sleeves 24 and parallel to the axis of shaft 13. Thus, as viewed in FIGURE 2, the margins 33 have an arcuate configuration whereby the portions most remote from the shaft 13 are closest together, and the portions nearest the shaft are farthest apart.

The valve member 14 preferably is shaped whereby its peripheral surface conforms generally to the configuration of the margins 33. In other words, as viewed in FIGURE 2, the side faces of the valve member 14 are convex to conform to cylinders, and portions of the valve member nearest the shaft 13 have the greatest thickness, while the portions most remote from the shaft are of reduced thickness.

The dimensioning of the parts is such that for the closed position shown in FIGURES 1 and 2, sealing contact is established between the peripheral surface of the valve member and the margins 33, along the two spaced peripheral zones 34. A closed annular space 35 is formed in the body part 11, and this space completely surrounds the sleeves 24. The zones 34 conform generally to the configurations of the margins 33, although the actual contact is established between the inner peripheral surfaces of the margins 33 and the peripheral surface of the valve member, as shown in FIGURE 3. Contact pressure is maintained for closed position without line pressure because the margins 33 are sprung outwardly a small amount, within the elastic limit of the metal walls forming the sleeves. Such spring action is made possible largely because the margins 33 are not planar. It may be explained at this point that if the margins 33 conformed to planes like the margins 26, then any spring action would necessitate elongation of the metal walls. However, with a nonplanar configuration of the margins 33, the spring action utilizes both flexing and elongation of the metal walls.

The spring action referred to above makes for positive seals along the two zones, and in addition this feature together with the fact that the sleeves 24 are formed of relatively thin spring metal, makes for even distribution of the contact pressure, irrespective of inaccuracies in manufacture and alignment.

It will be evident that the valve described above may be provided with various devices for carrying the shaft 13. By way of example, a head 36 is shown fixed upon a fluted end 37 of shaft 13, and in turn is provided with a squared portion 41 adapted to receive the operating wrench 42. The head 36 cooperates with the body plate 43 to provide limiting stops (not shown), and suitable means for indicating the position of the valve.

Operation of my valve is as follows: Assuming that no line pressure is being applied, the two thin metal sleeves 24 establish metal-to-metal seals with the peripheral surface of the valve member 14, in the manner described above. Seals are established along the two spaced zones 34, which extend on opposite sides of the shaft 13. Assuming now that the valve is connected to a line and fluid pressure applied to one of the passages 13, as for example, the left hand passage, line pressure initially acts upon the upstream metal sleeve 24, whereby fluid leakage occurs past the upstream sealing zone 34, until the pressure in the closed space 35 is equal to the upstream pressure. Fluid pressure in the space 35 is applied to the exterior surface of the downstream sleeve 24, whereby the downstream sleeve has its margin 34 pressed into sealing contact along the downstream sealing zone 34. In other words, upstream fluid pressure is applied in addition to the natural spring action to maintain a desired seal upon the downstream side. Assuming that the line flow is reversed and applied to the right hand passage 16, the action is essentially the same. In other words, the space 35 is placed in pressure communication with the upstream side, and the downstream sleeve 24 is urged by fluid pressure into tighter contact along the sealing zone 34. When the valve member 14 is turned from closed to full open position, the major part of the periphery of the valve member is separated from the margins 33. However, portions of the valve member near the ends of the shaft 13 remain in contact with the margins 33. The metal sleeves readily "give" a sufficient amount to accommodate such contacts near the shaft 13, without causing permanent deformation or other injury.

It will be evident from the foregoing that I have provided a resilient form of all metal sealing means for a butterfly valve, which will afford a good sealing contact, while at the same time permit a substantial variation in tolerances and alignment.

The wall thicknesses employed for the sleeves 24 will depend upon various factors, including the size of the valve, and the operating pressures. By way of example, for a four-inch pipe size valve intended for operating pressures ranging from 50 to 250 p.s.i., the sleeves 24 may be made of stainless steel with a wall thickness ranging from 0.020 to 0.030 inch.

Reference has been made to the use of low or high operating temperatures made possible by the use of metal sealing means. Where the temperatures are sufficiently low or high as to prevent the use of seal rings 21 and 31 of the O-ring type, it is evident that other sealing expedients can be used, such as conventional stuffing glands, metal gaskets, and the like.

I claim:
1. In a butterfly valve a body having aligned cylindrical flow passages, each having aligned first axes, a valve member within said body, means mounting said valve member for turning movement about a second axis transverse to said first axis between a closed position in which said valve member extends substantially at right angles to said first axis and an open position generally in a plane coincident with said second axis, said valve member having a shape in a plane at right angles to said second axis such that its periphery is convex, being thicker adjacent said second axis and thinner adjacent the walls of said flow passages, thin spring metal sleeves each of generally cylindrical shape and disposed parallel to said first axis, means sealing a first edge of each said sleeve remote from said valve member to a wall of said flow passages, the second edge of said sleeve adjacent said valve member being spaced from and flexible relative to said walls and having a non-planar concave shape complementary to the convex periphery of said valve member, said second edge of said sleeve in the closed position of said valve member both flexing and elongating to seal around the entire peripheral edge of said valve member with an annular space between said sleeve and said flow passage, whereby pressure in said valve body supplements the resiliency of said sleeve to maintain sealing contact pressure of said non-planar second edge of said sleeve with said valve member.

2. A valve according to claim 1, in which said second edge is coincident with a section of a cylinder having its axis parallel to said second axis.

3. A valve according to claim 1, in which said means sealing said first edge of each said sleeve comprises a ring mounted in said body surrounding said flow passage and in which said body interiorly of said ring is of greater inside diameter than said ring, said sleeve being of minimum diameter substantially equal to the inside diameter of said ring.

References Cited in the file of this patent
UNITED STATES PATENTS

| | | |
|---|---|---|
| 2,573,177 | Bohlen | Oct. 30, 1951 |
| 2,863,630 | Broz | Dec. 9, 1958 |
| 2,890,856 | Clade | June 16, 1959 |
| 2,893,682 | Hintzman | July 7, 1959 |
| 2,913,218 | Broz | Nov. 17, 1959 |
| 2,974,921 | Kaswan | Mar. 14, 1961 |

FOREIGN PATENTS

| | | |
|---|---|---|
| 781,183 | Great Britain | Aug. 14, 1957 |
| 1,116,056 | France | Jan. 23, 1956 |
| 1,213,643 | France | Nov. 2, 1959 |
| 1,238,094 | France | June 27, 1960 |